Patented May 30, 1939

2,160,030

UNITED STATES PATENT OFFICE 2,160,030

PROCESS FOR THE PRODUCTION OF ALCOHOLIC SOLUTIONS OF SULPHUR AND METAL SULPHIDES

Paul Nitsche, Dresden, Germany

No Drawing. Application September 1, 1938, Serial No. 227,963. In Germany January 21, 1936

7 Claims. (Cl. 252—6)

It is known to bring elementary sulphur into a concentrated solution with benzylamine or hydrogenated aromatic amines, such as for example cyclohexylamine, piperidine, nicotine and so forth, which solution when introduced into water separates the sulphur in colloidal form. The aqueous colloidal sulphur solutions thus obtained are suitable especially for combating animal or vegetable parasites and also for technical purposes.

These aqueous sulphur solutions have, however, the disadvantage that they contain the sulphur only in colloidal form and have only a limited durability and limited active properties.

This application is a continuation-in-part of application Serial No. 159,531, filed August 17, 1937, for Process for the production of aqueous and alcoholic solutions of sulphur and metal sulphides.

It has now been found that the concentrated sulphur solutions obtained with benzylamine or hydrogenated aromatic amines may be converted into dilute, alcoholic true sulphur solutions applicable for practical use (cosmetics, therapeutics, combating of pests) by adding solution promoters to an alcohol selected from the group consisting of methyl and ethyl alcohol. Such solution promoters are selected from the group consisting of cyclohexylamine-olein soaps, the alkali salts, particularly the potash soaps, of oleic acid, fatty alcohol sulphonates, turkey red oil and triethanolamine.

The true alcoholic solutions obtained exhibit much higher active properties than the known colloidal sulphur solutions, in which the sulphur is not in true solution and in which it can no longer be converted into a true (correct) solution even by the addition of other solution promoters.

It has furthermore been found that it is possible in this way to convert into true alcoholic solutions not only elementary sulphur but also sulphur compounds, such as sulphide of arsenic, sulphide of antimony and sulphide of selenium.

Example 5 parts by weight of elementary sulphur are dissolved in 45 parts by weight of benzylamine and this solution is then mixed further with a solution of 10 parts by weight of triethanolamine in 40 parts by weight of methyl or ethyl alcohol.

The alcoholic solutions obtained according to the example may be employed in medicine as liniments or embrocations for skin diseases, falling-out of the hair and rheumatic conditions.

In the example it is also possible to employ sulphide of arsenic, sulphide of antimony or sulphide of selenium instead of elementary sulphur.

I claim:

1. A process for the production of stable true alcoholic solutions of substances of the class consisting of elementary sulphur, sulphide of arsenic, sulphide of antimony, and sulphide of selenium, which includes the step of introducing a concentrated solution of a substance of the aforesaid class in a solvent selected from the group consisting of benzylamine and hydrogenated cyclic amines into a solvent selected from the group consisting of methyl and ethyl alcohol and containing a solution promoter selected from the group consisting of cyclo-hexyl-amine-olein soaps, the alkali salts of oleic acid, fatty alcohol sulphonates, Turkey red oil, and triethanolamine.

2. A process for the production of stable, true alcoholic solutions of substances of the class consisting of elementary sulphur, sulphide of arsenic, sulphide of antimony and sulphide of selenium, which includes the step of introducing a concentrated solution of a substance of the aforesaid class in a solvent selected from the group consisting of benzylamine and hydrogenated cyclic amines into a solvent selected from the group consisting of methyl and ethyl alcohols and containing a solution promoter selected from the group consisting of cyllo-hexyl-amine-olein soaps, the alkali salts of oleic acid, fatty alcohol sulphonates, Turkey red oil, and triethanolamine.

3. Stable, true alcoholic solutions of substances of the class consisting of elementary sulphur, sulphide of arsenic, sulphide of antimony and sulphide of selenium soluble in a solvent of the group consisting of benzyl-amine and hydrogenated cyclic amines, the said solution comprising an alcohol selected from the group consisting of methyl and ethyl alcohols, a substance of the aforesaid class, a solvent of the aforesaid group, and a solution promoter selected from the group consisting of cyclo-hexyl-amine-olein soaps, the alkali salts of oleic acid, fatty alcohol sulphonates, Turkey red oil, and triethanolamine.

4. Stable, true alcoholic solutions of substances of the class consisting of elementary sulphur, sulphide of arsenic, sulphide of antomony and sulphide of selenium soluble in a solvent of the group consisting of benzyl-amine and hydrogenated cyclic amines, the said solution comprising methyl alcohol, a substance of the aforesaid class, a solvent of the aforesaid group, and a solution promoter-selected from the group consisting of cyclo-hexyl-amine-olein soaps, the alkali salts of oleic acid, fatty alcohol sulphonates, Turkey red oil and triethanolamine.

5. A stable, true solution of elementary sulphur consisting of ethyl alcohol, elementary sulphur, benzyl-amine and triethanolamine.

6. A stable, true solution of elementary sulphur consisting of methyl alcohol, elementary sulphur, benzylamine and triethanolamine.

7. A stable, true alcoholic solution of a substance of the class consisting of elementary sulphur, sulphide of arsenic, sulphide of antimony and sulphide of selenium comprising ethyl alcohol, a substance of the aforesaid class, a solvent selected from the group consisting of benzylamine and hydrogenated cyclic amines, and a solution promoter selected from the group consisting of cyclo-hexyl-amine-olein soaps, the alkali salts of oleic acid, fatty alcohol sulphonates, Turkey red oil and triethanolamine.

PAUL NITSCHE.